(12) United States Patent
Riese et al.

(10) Patent No.: US 12,466,474 B2
(45) Date of Patent: Nov. 11, 2025

(54) METHOD FOR INFLUENCING A STIFFNESS BEHAVIOR OF A VEHICLE ASSEMBLY OF A VEHICLE

(71) Applicant: Robert Bosch GmbH, Stuttgart (DE)

(72) Inventors: Christian Riese, Stuttgart (DE); Matthias Ehrmann, Neuhausen (DE); Thomas Kurz, Roemerberg (DE); Tobias Ritz, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 18/313,550

(22) Filed: May 8, 2023

(65) Prior Publication Data

US 2023/0356773 A1    Nov. 9, 2023

(30) Foreign Application Priority Data

May 9, 2022 (DE) ...................... 10 2022 204 507.6

(51) Int. Cl.
*B62D 6/00* (2006.01)
*B62D 5/04* (2006.01)

(52) U.S. Cl.
CPC ........... *B62D 6/001* (2013.01); *B62D 5/0418* (2013.01)

(58) Field of Classification Search
CPC ............................ B62D 6/001; B62D 5/0418
See application file for complete search history.

(56) References Cited

U.S. PATENT DOCUMENTS 10,308,282 B2 *   6/2019   Katzourakis ........... B62D 6/006

FOREIGN PATENT DOCUMENTS

DE    10 2021 209 247       *   3/2023
DE    10 2021 209 247 A1        3/2023

* cited by examiner

Primary Examiner — Gertrude Arthur Jeanglaude
(74) Attorney, Agent, or Firm — Maginot, Moore & Beck LLP

(57) ABSTRACT

A method for influencing a stiffness behavior of a vehicle assembly of a vehicle includes changing a wheel steering angle of at least one vehicle wheel of the vehicle using at least one wheel steering angle controller of a steering system of the vehicle, and reducing a stiffness of the vehicle assembly by configuring and/or adapting a chassis characteristic of the vehicle. The method further includes actuating the at least one wheel steering angle controller in at least one driving mode state to selectively influence the stiffness behavior of the vehicle assembly, such that a change in the stiffness of the vehicle assembly caused by the configuration and/or adaptation of the chassis characteristic is compensated as a function of a driving situation.

10 Claims, 2 Drawing Sheets

METHOD FOR INFLUENCING A STIFFNESS BEHAVIOR OF A VEHICLE ASSEMBLY OF A VEHICLE

This application claims priority under 35 U.S.C. § 119 to patent application no. DE 10 2022 204 507.6, filed on May 9, 2022 in Germany, the disclosure of which is incorporated herein by reference in its entirety.

The disclosure relates to a method for influencing a stiffness behavior of a vehicle assembly of a vehicle. The disclosure also relates to a computing unit for carrying out such a method and a vehicle comprising such a computing unit.

BACKGROUND

When designing a vehicle or a chassis, there is typically a conflict of objectives between improved ride comfort and improved driving dynamics. For comfort reasons, the objective is achieving the softest possible behavior, whereas for driving dynamics and safety reasons, the objective is achieving the stiffest possible behavior. Normally, therefore, a stiffer design is preferred at the expense of ride comfort, even though this design is not necessary for all driving situations. Alternatively, an attempt is made to resolve the conflict of objectives on the chassis side by means of additional components, for example by means of an additional control arm, but this is associated with increased effort and cost.

For electric vehicles, a high level of ride comfort is becoming even more important, among other things due to the elimination of the fundamental vibration of the internal combustion engine, which is why the requirements for comfort continue to increase. This further exacerbates the already existing conflict of objectives. Moreover, due to the very high torque of electric motors, a stiffer behavior is required to provide appropriate support for the drive torque of the electric motor.

A method for influencing a stiffness behavior of a vehicle assembly of a vehicle has been proposed in the post-published DE 10 2021 209 247 A1, wherein at least one wheel steering angle controller is actuated to selectively influence the stiffness behavior of the vehicle assembly in order to change a toe angle of a vehicle wheel. In this case, however, there is no targeted configuration and/or adaptation of a chassis characteristic in order to intentionally reduce a stiffness of the vehicle assembly and thereby in particular increase ride comfort. Therefore, in this case, no change in a stiffness of the vehicle assembly caused by a configuration and/or adaptation of a chassis characteristic is compensated as a function of the driving situation.

The object of the disclosure is in particular to provide a method for influencing a stiffness behavior of a vehicle assembly with improved properties with respect to a driving behavior. The object is achieved by the features described herein.

SUMMARY

A method, in particular a computer-implemented method, for influencing, in particular in a targeted manner, a stiffness behavior of a vehicle assembly of a vehicle, in particular a motor vehicle, is proposed, wherein the vehicle comprises a steering system with at least one wheel steering angle controller for changing a wheel steering angle of at least one vehicle wheel, wherein a chassis characteristic of the vehicle is configured and/or adapted such that a stiffness of the vehicle assembly is reduced, in particular intentionally, and wherein the wheel steering angle controller is actuated in at least one driving mode state to selectively influence the stiffness behavior of the vehicle assembly such that a change in the stiffness of the vehicle assembly caused by the configuration and/or adaptation of the chassis characteristic is compensated as a function of the driving situation. The wheel steering angle controller is in particular actuated at least temporarily and as a function of a current driving situation such that a, in particular virtual, stiffening of the vehicle assembly, in particular in the longitudinal direction of the vehicle and/or in the transverse direction of the vehicle, is achieved. The wheel steering angle controller is moreover not actuated continuously in this context, but only in the corresponding driving situation. Furthermore, in principle also multiple, in particular at least two, at least three and/or at least four, chassis characteristics can be adapted in order to reduce a stiffness of the vehicle assembly. This embodiment can improve a driving behavior. It is in particular possible to achieve improved ride comfort and at the same time provide improved driving dynamics in a situation-specific manner, which advantageously resolves the conflict of objectives between improved ride comfort and improved driving dynamics. An advantageous chassis design can furthermore be realized as well.

In this context, a "vehicle assembly" is intended to be understood to mean at least a part and/or a subassembly of the vehicle and preferably a chassis of the vehicle. The vehicle assembly in particular comprises at least one operative connection to the wheel steering angle controller. The vehicle assembly can in principle also include the wheel steering angle controller. In the present case, the vehicle assembly particularly advantageously comprises at least one steering component, in particular of the steering system, at least one drive component, in particular of a drive system of the vehicle, at least one brake component, in particular of a brake system of the vehicle and/or at least one chassis bearing. A "wheel steering angle controller" is moreover in particular intended to be understood to mean an actuator unit which is operatively connected to at least one vehicle wheel and is provided for transmitting a steering input to the vehicle wheel by changing a wheel steering angle of at least one vehicle wheel and thereby advantageously control at least one alignment of the vehicle wheel and/or influence a direction of travel of the vehicle. For this purpose, the wheel steering angle controller advantageously comprises at least one steering actuating element, for example in the form of a toothed rack, and at least one steering actuator which is operatively connected to the steering actuating element, for example in the form of an electric motor. The wheel steering angle controller can also be assigned to a vehicle axle configured as a front axle or a vehicle axle of the vehicle configured as a rear axle.

The vehicle also comprises at least one computing unit, which is provided to carry out the method for influencing the stiffness behavior of the vehicle assembly. A "computing unit" is in particular intended to be understood to mean an electrical and/or electronic unit which comprises an information input, an information processing and an information output. The computing unit advantageously further comprises at least one processor, at least one operating memory, at least one input and/or output means, at least one operating program, at least one control routine, at least one calculation routine, at least one evaluation routine and/or at least one adaptation routine. The computing unit is in particular provided for actuating the wheel steering angle controller. The computing unit is in particular provided to actuate the wheel steering angle controller in at least one driving mode state to selectively influence the stiffness behavior of the vehicle assembly such that a change in the stiffness of the vehicle assembly caused by the configuration and/or adaptation of the chassis characteristic is compensated as a function of the driving situation, i.e. as a function of a current driving situation. The computing unit is preferably integrated in a control unit of the vehicle, for example a central vehicle control unit, or a control unit of the steering system, in particular in the form of a steering control unit. A "stiffness behavior" is in particular intended to be understood to mean a variable correlated with a stiffness, an oscillation, a vibration and/or a pretensioning of the vehicle assembly, and/or a variable correlated with a stiffness, an oscillation, a vibration and/or a pretensioning of a peripheral assembly operatively connected to the vehicle assembly. A "chassis characteristic" is furthermore in particular intended to be understood to mean an, advantageously adaptable and/or variable, characteristic of the chassis, for example in the form of a chassis parameter, which is correlated with a design of the chassis, a structure of a wheel suspension and/or at least one driving dynamics property such as lateral dynamics and/or longitudinal dynamics of the vehicle. The chassis characteristic is particularly preferably a variable that changes when a chassis bearing of the vehicle is adjusted. "Provided" is in particular intended to be understood to mean specially programmed, designed and/or equipped. An object being provided for a specific function is in particular intended to be understood to mean that the object fulfills and/or carries out this specific function in at least one application and/or operating state.

According to one advantageous embodiment of the disclosure, it is proposed that the chassis characteristic is associated with a used degree of hardness of a chassis bearing of the vehicle. Preferably, soft chassis bearings are used, i.e. chassis bearings which are softer than an initial configuration and/or normal configuration. This can in particular improve ride comfort.

It is also proposed that the wheel steering angle controller is actuated at least during an acceleration and/or braking process of the vehicle such that an, in particular virtual, stiffening of the vehicle assembly, in particular in the transverse direction of the vehicle, is achieved. For this purpose, the steering actuator of the wheel steering angle controller can be appropriately energized and/or supplied with a corresponding holding current, for example. The wheel steering angle controller is in particular not actuated continuously to influence the stiffness behavior of the vehicle assembly, but only during the acceleration and/or braking process. Furthermore, to determine the acceleration and/or braking process, an actuation signal and/or an operating signal of a vehicle pedal, the drive system and/or the brake system of the vehicle, for example in the form of a drive and/or braking torque command, can be determined and evaluated. In particular a situationally necessary high stiffness can thus be made available, as a result of which driving dynamics and thus operational reliability can advantageously be improved.

The wheel steering angle controller can in particular be actuated simultaneously with the initiation of the acceleration and/or braking process, which advantageously makes it possible to achieve a corresponding virtual stiffening in lateral direction and reduce or avoid the lifting of a wheel carrier. Thus, good directional stability and driving stability can be achieved by such an actuation. According to a preferred configuration, however, it is proposed that the wheel steering angle controller is actuated with a time delay at the start of the acceleration and/or braking process. In this case, a start of the acceleration and/or braking process and a start of the actuation of the wheel steering angle controller in particular occur at different times. The wheel steering angle controller is particularly preferably actuated chronologically after the start of the acceleration and/or braking process, in particular at least 50 ms or at least 100 ms and/or at most 200 ms or at most 150 ms after the start of the acceleration and/or braking process. This makes it possible to achieve a particularly high level of ride comfort. Moreover, because of the small time offset, a high driving stability can be achieved at the same time and essentially without negatively influencing a vehicle trajectory.

It is further proposed that the wheel steering angle controller is actuated in such a way that a predetermined vehicle trajectory remains unchanged. In this context, in particular a rotation of a vehicle wheel possibly occurring as a result of a drive and/or braking torque can be compensated. A corresponding correction preferably takes place chronologically directly after a drive and/or braking torque jolt, so that the vehicle remains on a target trajectory correlated with the predetermined vehicle trajectory, but would leave it without the respective correction. This in particular makes it possible to provide an advantageously unobtrusive method and achieve a comfortable driving behavior.

In a further embodiment, it is proposed that a change in the stiffness of the vehicle assembly caused by aging and/or wear effects is determined and taken into account in the driving mode state when the wheel steering angle controller is actuated, in particular such that the change in the stiffness of the vehicle assembly caused by the aging and/or wear effects is compensated too. This can in particular increase an operational reliability. A service life and/or a fatigue strength of the vehicle can advantageously be improved as well.

It is also proposed that the steering system is configured as a steer-by-wire steering system, in which a steering input, in particular from a driver, is advantageously transmitted to the vehicle wheels purely electrically. In this case, the wheel steering angle controller can in particular be configured as a central controller and assigned to at least two, in particular steerable, vehicle wheels. However, the wheel steering angle controller is preferably configured as a single wheel controller and is assigned to exactly one, in particular steerable, vehicle wheel. This in particular makes it possible to achieve an advantageously flexible and/or unobtrusive adaptation of the stiffness behavior of the vehicle assembly.

The method for influencing the stiffness behavior of the vehicle assembly is not intended to be limited to the above-described application and embodiment. In order to carry out a function described here, the method for influencing the stiffness behavior of the vehicle assembly can in particular comprise a number of individual elements, components and units that differs from a number specified here.

BRIEF DESCRIPTION OF THE DRAWINGS

Further advantages will become apparent from the following description of the drawing. The drawings show an embodiment example of the disclosure.

The Figures Show.

DETAILED DESCRIPTION

Figure 1:
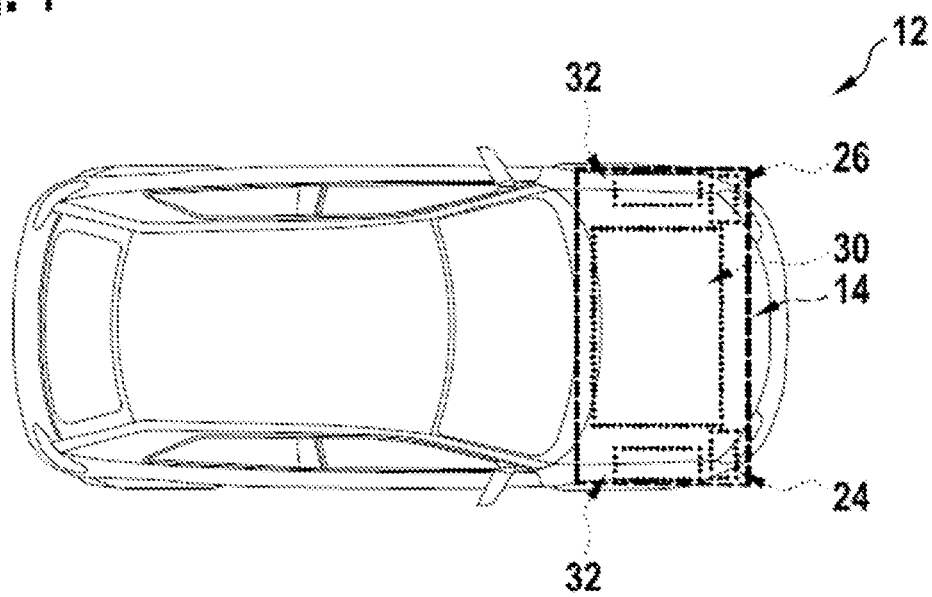
FIG. 1 a vehicle comprising a drive system, a brake system and a steering system, configured as an example as a steer-by-wire steering system, in a simplified illustration, FIG. 2 the steering system in a detailed illustration.

FIG. 1 shows a simplified illustration of a vehicle 12 which is configured as an example as a passenger vehicle and comprises multiple vehicle wheels 20, 22. In the present example, the vehicle 12 is configured as a conventional combustion engine vehicle. In principle, however, a vehicle can also be configured as a hybrid vehicle or an electric vehicle.

The vehicle 12 comprises a per se known drive system 30. The drive system 30 comprises a (not depicted) vehicle drive, for example configured as a drive motor, and a (not depicted) vehicle transmission which cooperates with the drive motor and is configured as an automatic transmission, for example. In the present embodiment example, the drive system 30 is disposed as an example in a front area of the vehicle 12. The drive system 30 is designed to provide a drive functionality for moving the vehicle 12 in a longitudinal direction or for accelerating the vehicle 12. In principle, however, a drive system could also be free of a vehicle transmission. A drive system could moreover in principle also include a plurality of wheel hub motors or the like. A drive system can furthermore also be disposed in a rear area of a vehicle.

The vehicle 12 also comprises a per se known brake system 32. The brake system 32 comprises a plurality of (not depicted) brake units, configured in particular as a service brake, wherein in the present case one of the brake units is assigned to each one of the vehicle wheels 20, 22. The brake system 32 is designed to provide a braking functionality for decelerating the vehicle 12 in longitudinal direction. In principle, however, a number of brake units could also differ from a number of vehicle wheels.

The vehicle 12 further comprises a plurality of chassis bearings 24, 26. In FIG. 1, two chassis bearings 24, 26 are indicated on different sides of the vehicle purely as an example. The chassis bearings 24, 26 have a certain degree of hardness, wherein soft chassis bearings 24, 26, i.e. chassis bearings 24, 26 which are softer than an initial configuration and/or normal configuration, are used in the present case.

Figure 2:
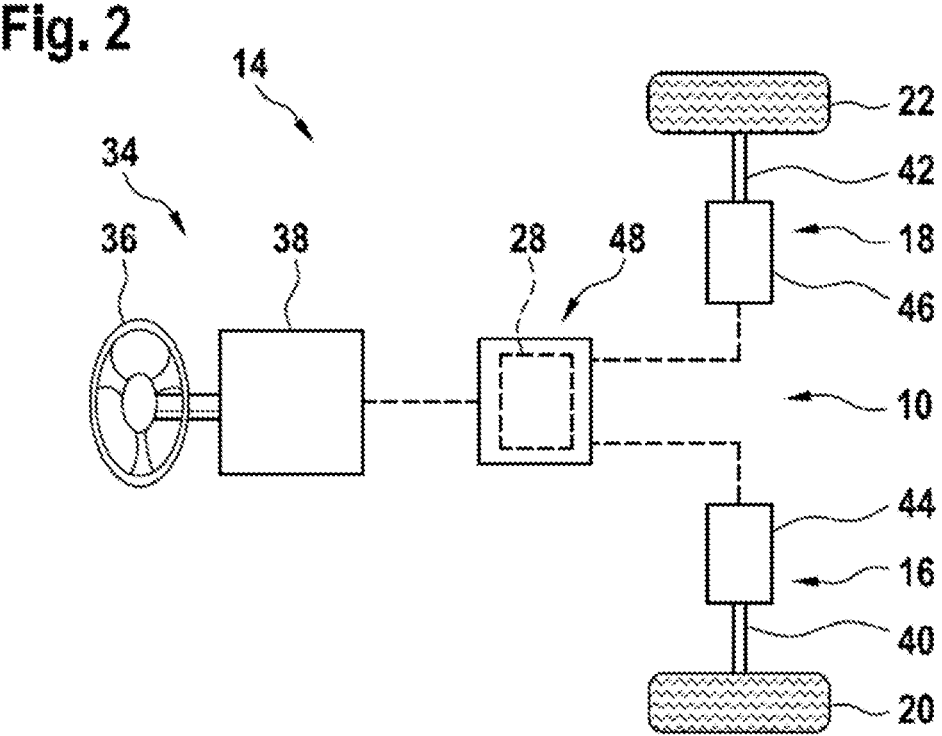

The vehicle 12 also comprises a steering system 14 (see in particular also FIG. 2). The steering system 14 is designed to provide a steering functionality for steering or moving the vehicle 12 in a transverse direction. In the present case, the steering system 14 is moreover configured as a steer-by-wire steering system, so that a steering input is transmitted exclusively electrically to the vehicle wheels in at least one operating state. In principle, however, a steering system could also be configured as a conventional steering system with a mechanical feedthrough and electrical steering assistance in the form of a servo steering system.

The steering system 14 comprises a per se known operating unit 34. The operating unit 34 comprises a steering handle 36, for example in the form of a steering wheel, and a feedback actuator 38 which is in particular mechanically coupled to the steering handle 36. In the present case, the feedback actuator 38 is provided at least for generating a steering resistance and/or a restoring torque on the steering handle 36. A steering handle could alternatively also be configured as a joystick, a steering lever and/or as a steering ball or the like. A feedback actuator could in principle also be omitted. It is also conceivable to completely forgo an operating unit.

The steering system 14 further comprises at least one wheel steering angle controller 16, 18. As an example, the steering system 14 in the present case comprises two wheel steering angle controllers 16, 18 configured as a single wheel controller and consequently in particular wheel individual steering. The wheel steering angle controllers 16, 18 are at least substantially structurally identical. The wheel steering angle controllers 16, 18 are configured separately from one another and in the present case are free of a mechanical connection. The wheel steering angle controllers 16, 18 can be actuated independently of one another. The wheel steering angle controllers 16, 18 are moreover connected to the operating unit 34 and consequently the steering handle 36 purely electrically. Each of the wheel steering angle controllers 16, 18 is operatively connected to exactly one of the vehicle wheels 20, 22, in particular a front wheel. The wheel steering angle controllers 16, 18 are provided to change a respective wheel steering angle of the corresponding vehicle wheel 20, 22 as a function of a steering input. For this purpose, each of the wheel steering angle controllers 16, 18 comprises a steering actuating element 40, 42, embodied for example as a toothed rack, and a steering actuator 44, 46, which cooperates with the steering actuating element 40, 42 and is configured as an electric motor. A steering system could in principle of course also comprise a wheel steering angle controller configured as a central controller. A steering system can furthermore also comprise at least four wheel steering angle controllers configured as single wheel controllers. A steering system could in principle also comprise a combination of a wheel steering angle controller configured as a single wheel controller and a wheel steering angle controller configured as a central controller. Moreover, at least one wheel steering angle controller could in particular also be assigned to a vehicle wheel configured as a rear wheel.

The vehicle 12 further comprises a control unit 48. In the present case, the control unit 48 is configured as a steering control unit and is therefore part of the steering system 14. The control unit 48 has an electrical connection to the wheel steering angle controllers 16, 18. The control unit 48 also has an electrical connection to the operating unit 34. The control unit 48 is provided at least for controlling an operation of steering system 14.

For this purpose, the control unit 48 comprises a computing unit 28. The computing unit 28 comprises at least one processor (not depicted), for example in the form of a microprocessor, and at least one operating memory (not depicted). The computing unit 28 also comprises at least one operating program which is stored in the operating memory and includes at least one control routine, at least one calculation routine, at least one processing and/or evaluation routine 50 and at least one adaptation routine 52. A control unit could in principle also be different from a steering control unit and configured as a single, central vehicle control unit with a central computing unit, for example. It is also conceivable to provide separate control units for each wheel steering angle controller and for the operating unit and connect them to one another in a communicating manner. A control unit can moreover have an electrical connection to a drive system and/or a brake system.

The vehicle 12 can also comprise other not depicted components and/or assemblies, such as a surroundings sensor system for detecting a current driving situation, a navigation device for detecting a current driving situation and/or a per se known on-board computer. The control unit 48 preferably comprises an electrical connection to the surroundings sensor system, the navigation device and/or the on-board computer. In principle, however, it is also conceivable to omit a respective surroundings sensor system, a navigation device and/or an on-board computer.

When designing a vehicle 12 or a chassis, there is typically a conflict of objectives between improved ride comfort and improved driving dynamics. Normally, therefore, a stiffer design is preferred at the expense of ride comfort, even though this design is not necessary for all driving situations.

Therefore, to optimize and/or improve a driving behavior, a method for influencing a stiffness behavior of a vehicle assembly 10 of the vehicle 12 is proposed in the following. The vehicle assembly 10 is in particular a chassis assembly of a chassis of the vehicle 12. As an example, the vehicle assembly 10 in the present case comprises at least one steering component, in particular the wheel steering angle controller 16, 18. The computing unit 28 is furthermore provided here to carry out the method and in particular comprises a computer program with corresponding program code means. A vehicle assembly could in principle also be different from a steering system and include any other vehicle assembly, preferably of the chassis. The vehicle assembly can in particular alternatively or additionally also include at least one drive component and/or at least one brake component.

In the present case, a chassis characteristic of the vehicle 12 is configured and/or adapted such that a stiffness of the vehicle assembly 10 is reduced. The chassis characteristic is associated with a used degree of hardness of the chassis bearings 24, 26 and corresponds to a variable that changes when the chassis bearings 24, 26 are adjusted. The use of relatively soft chassis bearings 24, 26 leads to a fundamental reduction of the stiffness of the vehicle assembly 10, as a result of which improved ride comfort can be achieved.

According to the disclosure, in order to selectively influence the stiffness behavior of the vehicle assembly 10 in a driving mode state, at least one of the wheel steering angle controllers 16, 18 is actuated such that a change in the stiffness of the vehicle assembly 10 caused by the configuration and/or adaptation of the chassis characteristic is compensated as a function of the driving situation. The wheel steering angle controller 16, 18 is thus actuated as a function of a current driving situation such that a virtual stiffening of the vehicle assembly 10 is achieved. The wheel steering angle controller 16, 18 is moreover not actuated continuously in this context, but only in the corresponding driving situation. This actuation in particular makes it possible to achieve improved ride comfort and at the same time provide improved driving dynamics in a situation-specific manner, which advantageously resolves the conflict of objectives between improved ride comfort and improved driving dynamics.

The wheel steering angle controller 16, 18 or the wheel steering angle controllers 16, 18 can be actuated during an acceleration and/or braking process of the vehicle 12, for example, such that a virtual stiffening of the vehicle assembly 10 in the transverse direction of the vehicle is achieved. For this purpose, the steering actuator 44, 46 of the respective wheel steering angle controller 16, 18 can be appropriately energized and/or supplied with a corresponding holding current. The wheel steering angle controller 16, 18 or the wheel steering angle controllers 16, 18 are moreover preferably actuated with a time delay at the start of the acceleration and/or braking process. In the present case, the wheel steering angle controller 16, 18 or the wheel steering angle controllers 16, 18 are actuated chronologically after the start of the acceleration and/or braking process, specifically about 100 ms after the start of the acceleration and/or braking process, as a result of which in particular a high level of ride comfort and a high driving stability can be achieved, essentially without negatively affecting a vehicle trajectory. The wheel steering angle controller 16, 18 or the wheel steering angle controllers 16, 18 are moreover actuated in such a way that a predetermined vehicle trajectory remains unchanged. In this context, in particular a rotation of a vehicle wheel 20, 22 possibly occurring as a result of a drive and/or braking torque can be compensated. A corresponding correction preferably takes place chronologically directly after a drive and/or braking torque jolt, so that the vehicle 12 remains on a target trajectory correlated with the predetermined vehicle trajectory, but would leave it without the respective correction. Alternatively, however, at least one of the wheel steering angle controllers 16, 18 could also be actuated simultaneously with the initiation of the acceleration and/or braking process, which advantageously makes it possible to achieve a corresponding virtual stiffening in lateral direction and reduce or avoid the lifting of a wheel carrier. It is also conceivable to implement both of the aforementioned functionalities, i.e. an actuation with a time delay to a start of an acceleration and/or braking process and an actuation initiated simultaneously with a start of an acceleration and/or braking process, in a vehicle, so that a driver or a computing unit can choose, for example automatically as a function of a driving state, between a driving mode with a higher level of driving comfort and a driving mode with higher driving dynamics.

To determine the acceleration and/or braking process, an actuation signal and/or an operating signal of a vehicle pedal (not depicted), the drive system 30 and/or the brake system 32 of the vehicle, for example in the form of a drive and/or braking torque command, can be evaluated.

A further improvement of the driving behavior can also be achieved if a change in the stiffness of the vehicle assembly 10 caused by aging and/or wear effects is determined and taken into account in the driving mode state when the wheel steering angle controller 16, 18 or the wheel steering angle controllers 16, 18 is/are actuated, in particular such that the change in the stiffness of the vehicle assembly 10 caused by the aging and/or wear effects is compensated as well.

The present method therefore utilizes a connection between the drive system 30, the brake system 32 and the steering system 14 to improve an overall behavior of the vehicle 12 by optimized actuation of the wheel steering angle controllers 16, 18 and thus resolve or mitigate the conflict of objectives. Applying the function according to the disclosure makes it possible to use significantly softer chassis bearings 24, 26 and thus improve ride comfort and avoid the additional expense of additional control arm structures.

Figure 3:
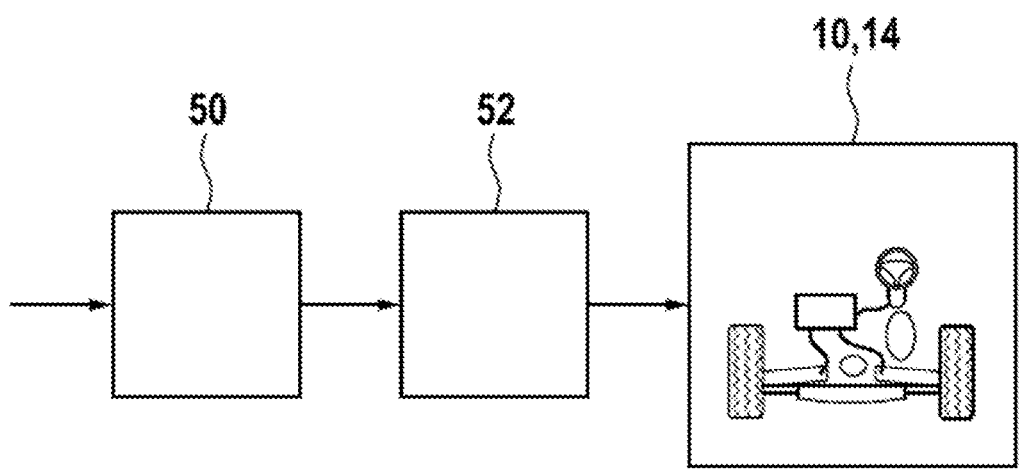
FIG. 3 an example of a signal flow diagram for influencing a stiffness behavior of a vehicle assembly of the vehicle.

FIG. 3 shows a schematic illustration of a simplified example of a signal flow diagram for influencing the stiffness behavior of the vehicle assembly 10 of the vehicle 12.

First, all of the signals and data present in the driving mode state of the vehicle 12, such as the actuation signal and/or operating signal of the vehicle pedal, the drive system 30 and/or the brake system 32, a steering input, in particular from a driver and/or a trajectory planning function, and/or route information, such as navigation data and/or surroundings data, are fed to the processing and/or evaluation routine 50 of the computing unit 28. The processing and/or evaluation routine 50 is provided to determine a current driving situation on the basis of the signals and data and forward it to the adaptation routine 52 of the computing unit 28. The adaptation routine 52 is provided to actuate the wheel steering angle controller(s) 16, 18 as a function of the current driving situation and thereby compensate a change in the stiffness of the vehicle assembly 10 caused by the configuration and/or adaptation of the chassis characteristic as a function of the driving situation, specifically in such a way that a driving behavior is improved and a situationally necessary high stiffness is made available. In this context, the wheel steering angle controller 16, 18 or the wheel steering angle controllers 16, 18 can be actuated during an acceleration and/or braking process of the vehicle 12, for example, such that a virtual stiffening of the vehicle assembly 10 in the transverse direction of the vehicle is achieved.

The example of a signal flow diagram in FIG. 3 is merely intended to describe an example of a method for influencing the stiffness behavior of the vehicle assembly 10 of the vehicle 12. In this context, it is conceivable, for example, to implement a selection routine which allows the computing unit 28 or a driver to choose between a driving mode with a higher level of driving comfort, i.e. an actuation of the wheel steering angle controller 16, 18 with a time delay to a start of an acceleration and/or braking process, and a driving mode with higher driving dynamics, i.e. an actuation of the wheel steering angle controller 16, 18 simultaneously with a start of an acceleration and/or braking process. The processing and/or evaluation routine 50 could also take into account other variables, such as a vehicle speed, to determine the current driving state.

What is claimed is:

1. A method for influencing a stiffness behavior of a vehicle assembly of a vehicle, comprising:
    changing a wheel steering angle of at least one vehicle wheel of the vehicle using at least one wheel steering angle controller of a steering system of the vehicle;
    reducing a stiffness of the vehicle assembly by configuring and/or adapting a chassis characteristic of the vehicle; and
    actuating the at least one wheel steering angle controller in at least one driving mode state to selectively influence the stiffness behavior of the vehicle assembly, such that a change in the stiffness of the vehicle assembly caused by the configuration and/or adaptation of the chassis characteristic is compensated as a function of a driving situation.

2. The method according to claim 1, wherein:
    the chassis characteristic is associated with a used degree of hardness of a chassis bearing of the vehicle, and soft chassis bearings are used.

3. The method according to claim 1, further comprising:
    actuating the at least one wheel steering angle controller at least during an acceleration process and/or braking process of the vehicle, such that a stiffening of the vehicle assembly in a transverse direction of the vehicle is achieved.

4. The method according to claim 3, wherein the at least one wheel steering angle controller is actuated with a time delay at a start of the acceleration process and/or at a start of the braking process.

5. The method according to claim 4, wherein the at least one wheel steering angle controller is actuated at least 50 ms after the start of the acceleration process and/or the start of the braking process.

6. The method according to claim 3, wherein the at least one wheel steering angle controller is actuated, such that a predetermined vehicle trajectory remains unchanged.

7. The method according to claim 1, further comprising:
    determining a change in a stiffness of the vehicle assembly caused by aging and/or wear in the drive mode state; and
    actuating the at least one wheel steering angle controller based on the determined change in a stiffness of the vehicle assembly.

8. The method according to claim 1, wherein:
    the steering system is configured as a steer-by-wire steering system, and
    the at least one wheel steering angle controller is configured as a single wheel controller.

9. The method according to claim 1, wherein a computing unit is configured to carry out the method.

10. A vehicle comprising:
    at least one vehicle wheel; and
    at least one vehicle assembly including a steering system operably connected to the at least one vehicle wheel, the at least one vehicle assembly having (i) at least one wheel steering angle controller configured to change a wheel steering angle of the at least one vehicle wheel, and (ii) a computing unit configured to influence a stiffness behavior of the at least one vehicle assembly, the computing unit configured to:
        change the wheel steering angle of the at least one vehicle wheel using the at least one wheel steering angle controller;
        reduce a stiffness of the vehicle assembly by configuring and/or adapting a chassis characteristic of the vehicle; and
        actuate the at least one wheel steering angle controller in at least one driving mode state to selectively influence the stiffness behavior of the vehicle assembly, such that a change in the stiffness of the vehicle assembly caused by the configuration and/or adaptation of the chassis characteristic is compensated as a function of a driving situation.

* * * * *